Nov. 23, 1965     N. J. MAHONEY     3,219,793
SECTIONAL WELDING ELECTRODE HOLDER
Filed March 15, 1963
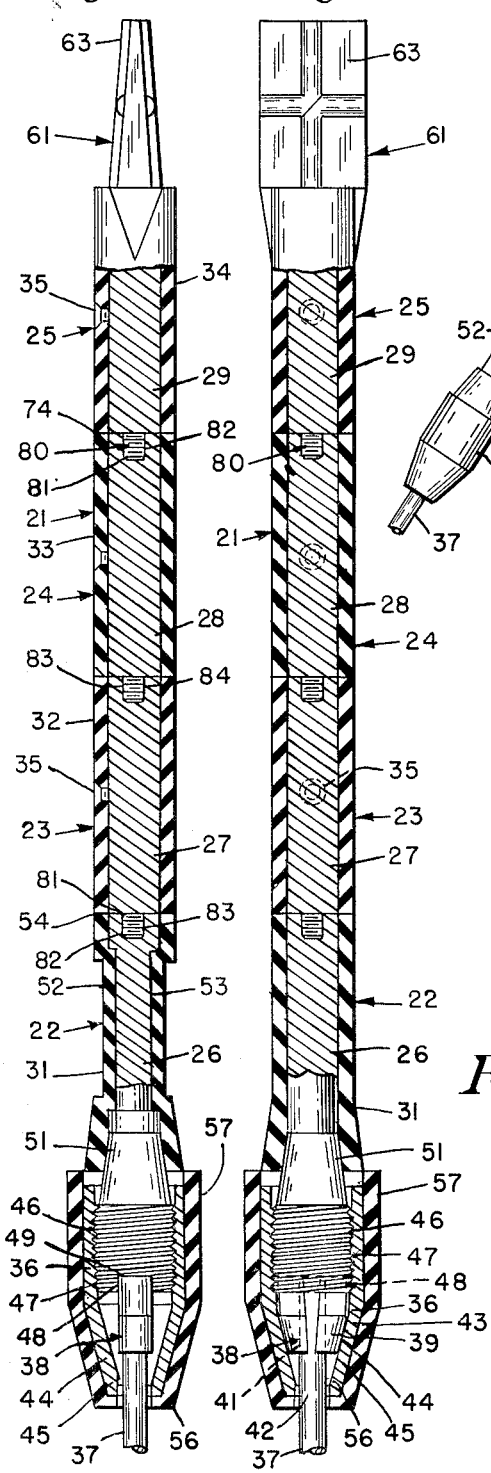
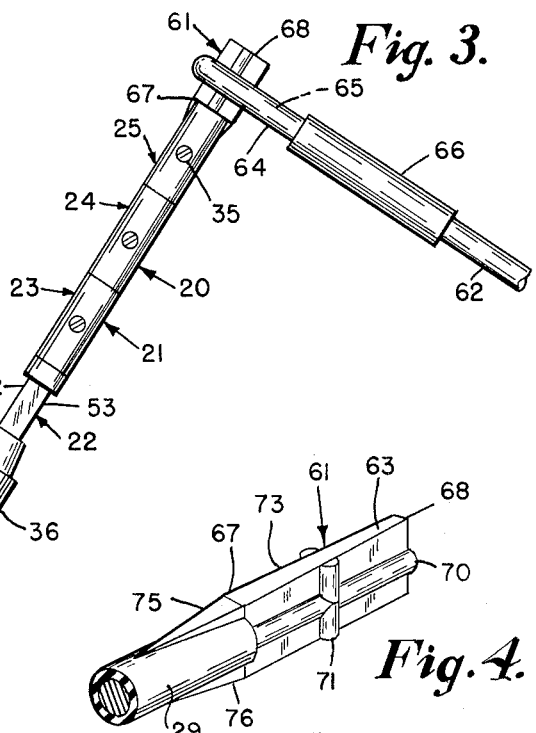
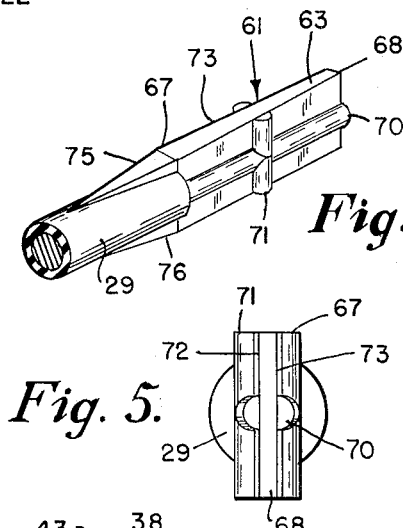
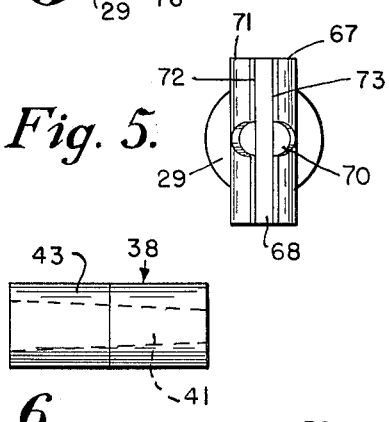
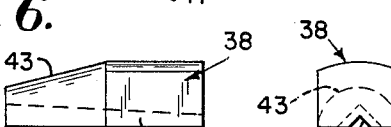
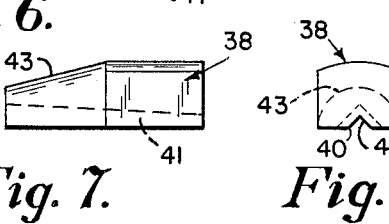
INVENTOR.
NATHANIEL J. MAHONEY
BY
Pearson + Pearson
ATTORNEYS

United States Patent Office 3,219,793
Patented Nov. 23, 1965

3,219,793
SECTIONAL WELDING ELECTRODE HOLDER
Nathaniel J. Mahoney, 666 Central St., Franklin, N.H.
Filed Mar. 15, 1963, Ser. No. 265,540
3 Claims. (Cl. 219—144)

This invention relates to a sectional welding electrode holder.

In the welding art, it is customary to hold an electrode in a spring loaded, notched jaw type holder, the holder being connected to the power cable and such holders are satisfactory for close-in work. It has also been proposed to mount a chuck in fixed position, or pivotably, on the end of a conductor cable for holding an electrode, the electrode thus being close to the cable for close-in work.

However, there are many occasions in welding when it is necessary or desirable to accomplish the weld through a small opening at considerable distance from the operator, or through a series of obstructions. Similarly, the capability of welding at a substantial distance from the workpiece, permits the operator to assume a more comfortable position, thus reducing operator fatigue.

One expedient sometimes used to accomplish a weld at a distance from the operator is to weld two or more rods together, this creating a tendency to break, or arc, at the bare joints when getting the rod in position to weld. This can be dangerous when the obstructions contain volatile liquids or gases resulting in the operator being burned and it is, of course, time consuming.

The principal object of this invention is to provide an elongated electrode holder in the form of a lance-like, electrically conductive rod entirely covered with electric insulation throughout its length, including an integral, insulation-covered chuck at one end to position the electrode at a substantial distance from the operator, the rod being sectional and having an integral, uninsulated, exposed, conductive tip at the other end grippable in a jaw type clamp leading to a flexible power cable.

A further object of the invention is to provide a novel electrode holder, which is divided into threadedly connected, insulated sections, one end section having an integral, exteriorly insulated chuck for holding the electrode and the other end section having an integral, flat elongated uninsulated tip plate arranged to be firmly gripped in, or quickly released from, a jaw type electrode holder.

Still another object of the invention is to provide an elongated, sectional, insulated, electrode holder having an integral, insulated chuck at one end to grip an electrode and having an integral, uninsulated, conductive plate at the other end to be gripped in the grooved, or notched jaws of a conventional electrode holder.

Other objects and advantages of the invention will be apparent from the claims, the description of the drawing and from the drawing in which:

FIG. 1 is a front view of an electrode holder constructed in accordance with the invention;

FIG. 2 is a side view thereof;

FIG. 3 is a side view, on a reduced scale showing a holder, with only two extensions in place, in the grip of a conventional jaw type electrode holder;

FIG. 4 is a fragmentary, perspective view of the integral, conductive tip, or plate, with insulation on the rod;

FIG. 5 is an end view of the conductive tip of the holder, and

FIGS. 6, 7 and 8 are plan, side and end views respectively of one of the jaws of the chuck means.

As shown in the drawing, a preferred embodiment of the sectional welding electrode holder 20 of the invention is in the form of a single, straight, elongated body 21 which may be several feet in length, depending on the distance between the work and the operator. When assembled to the selected length, the body 21 is electrically conductive but insulated because it is made up of jointed sections such as 22, 23, 24 and 25, each section being a rod 26, 27, 28 and 29 of electrically conductive material, for example brass or aluminum castings, covered with a sleeve, or coating 31, 32, 33 or 34 of electric insulation, for example "Tippersul" of the Du Pont Company or the like. The insulation is preferably at least $\frac{1}{32}$ inch in thickness and firmly secured on each rod by a counter-sunk set screw 35.

The end section 22 of body 21 includes the first conductive rod 26 covered with insulation 31 and an integral, insulation covered chuck means 36 for detachably holding and gripping a conventional welding electrode 37.

Chuck means 36 is preferably of the collet, or drill chuck, type with a pair of opposed jaws 38 and 39 each of conductive material and each having an axially extending groove such as 41 of angular cross section for firmly receiving the cylindrical face 42 of the electrode, the latter usually being of circular cross section. The angularly disposed corners 40 of the chuck jaws thus firmly grip the cylindrical face 42 of electrodes of large diameter, and the angularly disposed inner faces of the groove 41 firmly grip the cylindrical face of electrodes of small diameter, at four angularly spaced gripping points therearound, thus providing four angularly spaced air passages to aid in cooling the electrode gripping zone.

The highest internal heat occurs in the zone of this four point grip, because of the resistance between the two different metals of the chuck and electrode. The four point contact permits air circulation during use and faster cooling during the period when electrodes, or electrode holders, are being changed.

Each jaw such as 38 has a tapered face 43 for cooperating with the tapered, or conical, interior face 44 of a nosepiece 45, the nosepiece 45 being threaded at 46 on the terminal end 47 of rod 26 whereby rotation of the nosepiece from the forward open position to the rearward closed position moves the jaws toward each other for clamping the electrode. The terminal end 47 is slotted at 48 to receive the rearward portion 49 of each jaw to guide the jaws and prevent rotation thereof, thereby forming the stem of the collet chuck. The rod 26 flares outwardly at 51 to provide the enlarged stem and while the rods are preferably of circular cross section, the rod 26 is flattened on each opposite side at 52 and 53 to create a portion of non-circular cross section adapted to be gripped by the gloved hand of the operator when turning the nosepiece 45 to change electrodes. The insulation 31 covers the rod 26 from the joint 54 along the flattened portions 52 and 53 along the flared portion 51 and along the cylindrical stem portion 55 terminating at the threads 46. The nosepiece 45 is completely covered with insulation 56 on its exterior face and includes a cylindrical hood portion 57, also covered with insulation and overlapping the insulation on the cylindrical portion 55 of the rod to avoid any possibility of exposure of the conductive jaws or rod.

The section 25, at the other end of body 21, includes the second conductive rod 29 covered with insulation 34 and integral, uninsulated, exposed means 61 for providing an electrically conductive circuit from the electrode 37, along body 21 to a conductor cable 62.

Conductive means 61 is preferably in the form of an integral, uninsulated, exposed tip 63 at the terminal end of rod 29 adapted to be gripped in the opposite jaws 64 and 65 of a conventional spring loaded jaw type electrode holder 66 attached to the end of conductor cable 62. While the rod 29 is preferably of circular cross section, the integral tip 63 is of enlarged, flattened non circular cross section and forms a plate, or tongue with angular edges for fitting the conventional notches, or grooves in the jaws 64 and 65.

To further avoid slippage, while cooperating with jaw type holders of various dimensions, the tip plate 63 tapers from its base 67 to its terminal end 68 and is provided with crossed ribs such as 70 and 71 on each opposite face 72 and 73 for providing a plurality of gripping surfaces and assuring a good electrical connection. The insulation 34 extends from the base 67 to the joint 74, there being opposite tapered portions 75 and 76 for merging the tip 63 into the body 21 while reinforcing the tip.

The intermediate sections 23 and 24 of body 21, each include a conductive rod 27 or 28 covered with insulation 32 or 33, constituting insulated, conductive extension rods whereby an operator may elect to use only the end sections 22 and 25 or any desired number of intermediate sections to accomplish the particular weld desired.

Connecting means 80 is provided for permitting ready removal or insertion of one or more intermediate sections in the body 21, the means 80 preferably being a threaded connection. A threaded post 81 of reduced diameter extends axially from the section 25 and fits a threaded axial bore 82, also of reduced diameter in the section 22. Each intermediate section such as 23, includes an identical post 83 at one end and an identical axial bore 84 at the other end whereby the sections may be threadedly joined and detached while maintaining a good electrical connection from cable 62 to electrode 37.

In operation, as shown in FIG. 3, an operator may require only one intermediate section to position electrode 37 at the desired distance, or to insert the holder 20 lance-like into a deep hole or the like. The entire holder 20, when its threaded joints are tightened is completely insulated from the base 67 of the conductive tip 63 to the electrode 37. The holder 20 can be quickly released from the jaw type holder 66, for substitution of a holder of a different length or for resuming work with an electrode 37 alone. Only a turning movement is required to substitute electrodes or to vary the length of the holder 20, there being no danger of arcing or possibility of a break in a long, composite electrode.

I claim:

1. An elongated, sectional lance-like holder for welding electrodes, said holder comprising:
   a first electrically conductive rod having a covering of electric insulation entirely therearound;
   chuck means integrally mounted at one end of said first rod and covered with said electric insulation for detachably gripping a welding electrode;
   rod connecting means integral with the other end of said first rod;
   a second electrically conductive rod having a covering of electric insulation entirely therearound;
   an integral, uninsulated, exposed tip at one end of said second rod, said tip being elongated and grippable in a jaw type electrode holder for electric connection therewith;
   rod connecting means integral with the other end of said second rod;
   at least one electrically conductive intermediate, extension rod having a covering of electric insulation therearound, and
   rod connecting means at each opposite end of each said intermediate, extension rod cooperable with the rod connecting means of said first and second rods to connect all of said rods into a single, insulated, conductive, self supporting body.

2. A lance-like holder for welding electrodes, said holder comprising:
   an elongated sectional body of self supporting, electrically conductive material, entirely covered with electric insulation, said body having opposite end sections and at least one intermediate section;
   a chuck integral with one said end section and covered by said insulation, for detachably gripping a welding electrode, said section having an outwardly flared stem forming part of said chuck;
   an electrically-conductive, uninsulated, exposed, elongated tip integral with the other said end section, for gripping by, and electrical connection with, a jaw type electrode holder;
   and connecting means at the mating ends of said sections to permit one or more intermediate sections to be attached to, and detached from said body for varying the overall length thereof.

3. A holder as specified in claim 2 wherein:
   said electrically conductive, uninsulated, exposed, elongated tip is a tapered plate of generally flat, rectangular cross section having angular edges for firm engagement in the grooves of said jaw type holder; and having integral ribs defining a cross on each opposite face thereof.

References Cited by the Examiner

UNITED STATES PATENTS

| | | | |
|---|---|---|---|
| 2,034,259 | 3/1936 | Hopkins | 219—146 |
| 2,219,817 | 10/1940 | Negrich | 219—145 |
| 2,350,426 | 6/1944 | Thompson | 219—144 |
| 2,395,228 | 2/1946 | Lininger | 219—144 |
| 2,943,183 | 6/1960 | Simms et al. | 219—144 |
| 3,116,406 | 12/1963 | Barnes | 219—75 |

RICHARD M. WOOD, *Primary Examiner.*